(12) United States Patent
Hartmann

(10) Patent No.: US 8,585,519 B2
(45) Date of Patent: Nov. 19, 2013

(54) TENSIONING DEVICE FOR AN ENDLESS DRIVE MEANS HAVING A COMBINATION VALVE

(75) Inventor: Christian Hartmann, Nensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 274 days.

(21) Appl. No.: 13/052,223

(22) Filed: Mar. 21, 2011

(65) Prior Publication Data

US 2011/0237370 A1    Sep. 29, 2011

(30) Foreign Application Priority Data

Mar. 26, 2010   (DE) .................. 10 2010 012 918

(51) Int. Cl.
*F16H 7/08* (2006.01)
(52) U.S. Cl.
USPC ........................................................ 474/110
(58) Field of Classification Search
USPC ........... 474/110, 111, 135, 136, 138; 137/540
See application file for complete search history.

(56) References Cited

U.S. PATENT DOCUMENTS

| | | | | |
|---|---|---|---|---|
| 3,245,429 A * | 4/1966 | Bacino et al. | ............ | 137/543.21 |
| 3,580,275 A * | 5/1971 | Hanson et al. | ............ | 137/516.29 |
| 5,183,075 A * | 2/1993 | Stein | ........................ | 137/493.6 |
| 5,637,047 A * | 6/1997 | Schulze | ........................ | 474/110 |
| 7,021,331 B2 * | 4/2006 | Jernigan et al. | ................ | 137/540 |
| 7,201,184 B2 * | 4/2007 | Morrow et al. | ................ | 137/508 |
| 7,775,924 B2 * | 8/2010 | Koch | ............................. | 474/110 |
| 2004/0102273 A1 * | 5/2004 | Namie et al. | ................... | 474/110 |
| 2009/0197721 A1 * | 8/2009 | Emizu et al. | ................... | 474/110 |

FOREIGN PATENT DOCUMENTS

| | | |
|---|---|---|
| DE | 94 09 155 U1 | 10/1995 |
| DE | 199 57 527 A1 | 6/2000 |
| DE | 202 02 665 U1 | 7/2003 |
| DE | 699 08 702 T2 | 1/2004 |
| DE | 10 2004 040 222 A1 | 3/2006 |
| DE | 10 2004 043 727 A1 | 3/2006 |
| DE | 20 2006 018 836 U1 | 4/2008 |
| DE | 10 2007 036 119 A1 | 7/2008 |
| DE | 20 2007 004 988 U1 | 8/2008 |

* cited by examiner

*Primary Examiner* — William E Dondero
*Assistant Examiner* — Mark K Buse
(74) *Attorney, Agent, or Firm* — Lucas & Mercanti, LLP

(57) ABSTRACT

A tensioning device for an endless drive, which has a housing, in which there is an extendable cylinder. Between the housing and the cylinder there is a pressure chamber that can be filled with a pressure fluid via a supply opening in the housing. A combination valve, which has a nonreturn valve that can be opened in the direction of the pressure chamber, a movable first shutoff element, a pressure relief valve, which can be opened counter to the aforementioned direction and a movable second shutoff element inserted in the supply opening. The first shutoff element of the nonreturn valve is arranged substantially on the pressure-chamber side of the second shutoff element.

9 Claims, 4 Drawing Sheets

TENSIONING DEVICE FOR AN ENDLESS DRIVE MEANS HAVING A COMBINATION VALVE

This application claims the priority of DE 10 2010 012 918.6 filed Mar. 26, 2010, which is also incorporated by reference herein.

FIELD OF THE INVENTION

The invention relates to a tensioning device for an endless drive means, having a housing, in which there is an extendable cylinder, wherein, between the housing and the cylinder, there is a pressure chamber that can be filled with a pressure fluid via a supply opening in the housing, wherein a combination valve consisting of a nonreturn valve, which can be opened in the direction of the pressure chamber and has a movable first shutoff element, and a pressure relief valve, which can be opened counter to the aforementioned direction and has a movable second shutoff element, is inserted into the supply opening.

Tensioning devices, especially hydraulic tensioning devices, are often used in flexible drives for internal combustion engines. In general, the tensioning devices are required for deflecting a slide rail, over which the endless drive means is guided. The endless drive means is generally designed as a chain or belt. If a chain is used, this is usually constructed of steel links.

BACKGROUND OF THE INVENTION

An endless drive means of this kind is used in internal combustion engines, such as spark-ignition engines and diesel engines in motor vehicles, e.g. in passenger cars, trucks or similar land vehicles. However, they are also used in water- and aircraft.

Here, the endless drive means are arranged so as to transmit power between different shafts, e.g. between a crankshaft, one or more intermediate shafts and/or one or more camshafts.

Numerous tensioning devices are known from the prior art. Thus, Germany Utility Models DE 20 2006 018 836 U1 and DE 20 2007 004 988 U1 and German Laid-Open Application DE 10 2007 036 119 A1 disclose hydraulically operated tensioning devices which are used in internal combustion engines. Such tensioning devices have a housing which can be fixed on an engine component of the internal combustion engine. Conventional solutions are implemented by enabling the housing of the tensioning device to be screwed onto or into an engine component, such as the engine block. A cylinder is inserted into the housing, in particular into a bore in the housing and arranged in the housing in such a way that it can be extended from the said housing. To extend the cylinder out of the housing, a pressure chamber present between the cylinder and the housing can be filled with a pressure-transmitting fluid, that is to say a pressure fluid. A supply opening is provided in the housing for this purpose.

If a pressure fluid, such as oil, is now fed into the interior of the pressure chamber, the cylinder is forced to extend out of the housing of the tensioning device. As it does so, it exerts pressure on a tensioning rail that deflects the endless drive means.

In addition to the force exerted on the cylinder by the pressure fluid, a spring present in the pressure chamber can also apply force to the cylinder.

The pressure fluid is also intended to be able to exert a damping effect on the tensioning rail, and there is therefore a nonreturn valve in a supply opening in the pressure chamber. The pressure fluid, such as oil, e.g. a hydraulic oil, can then damp shocks transmitted by the endless drive means, e.g. those during cold starting processes.

To prevent the pressures prevailing in the pressure chamber from becoming too high, the previous practice was to choose the gaps between the cylinder and the housing in such a way that a certain leakage occurred and was even desired.

In the course of the further development of existing tensioning devices, there was, however, a need to be able to reduce the design delivery rate of pressure fluid pumps feeding pressure fluid to the pressure chamber. The leakage flows were therefore lower or smaller. As a result, however, another way had to be found to prevent excess pressure within the housing, i.e. between the housing and the cylinder, namely the pressure chamber. For this reason, additional pressure relief valves were increasingly installed in tensioning devices.

Tensioning devices with nonreturn valves and pressure relief valves are known from the prior art. Attention is drawn here to publications DE 10 2004 040 222 A1, DE 69908702 T2, DE 20202665 U1 and DE 10 2004 043 727 A1. While, in the two first-mentioned publications, a pressure relief valve, on the one hand, and a nonreturn valve, on the other, were provided at the opposite ends of the cylinder, DE 20202665 U1 takes the approach of providing both types of valve on one side of the cylinder. DE 10 2004 043 727 A1 also separates the two types of valve strictly from each other in terms of installation space.

However, these already known solutions from the prior art have the disadvantage that the installation space within the cylinder is greatly reduced and hence that only relatively short springs can be used between the cylinder and the housing, entailing disadvantages in terms of the spring characteristic. Moreover, the pressure chamber as such is reduced in size. Such solutions known from the prior art can thus only be implemented when the installation space is sufficiently large.

It has been found that installing a pressure relief valve and a nonreturn valve separately from each other requires more installation space than is normally available. Moreover, existing pressure relief valves have the disadvantage that there is an increase in the oil consumption of the tensioning device.

Alternative solutions have been made public by DE 19957527 A1 and DE 9409155 U1. In these two publications, combination valves are used as a nonreturn valve and pressure relief valve on one side of the cylinder. DE 9409155 U1 is considered to be the prior art that defines the generic type.

However, these known tensioning devices have the disadvantage that they still require a large amount of installation space and, furthermore, the pressure relief valve has a large mass, which prevents the use of these two known solutions on internal combustion engines of lightweight construction. Moreover, the accuracy of response of the known pressure relief valves in these documents is not sufficiently high.

It is therefore the object of the present invention to avoid the disadvantages of the prior art and to provide a tensioning device which has a pressure chamber that can be filled with pressure fluid, wherein the pressure chamber can be used as a damping element and, at the same time, a safeguard against excess pressure and a means of preventing backflow of oil is provided at the same time as high accuracy of response and low weight.

SUMMARY OF THE INVENTION

According to the invention, this object is achieved by virtue of the fact that the first shutoff element of the nonreturn valve is arranged substantially on the pressure-chamber side of the second shutoff element.

Such an embodiment according to the invention also makes it possible to direct or guide the fluid more effectively. Such tensioning devices allow above-average dynamic values and prevent obstructions in the flow of the pressure fluid.

Advantageous embodiments are claimed in the subclaims and are explained in greater detail below.

It is advantageous, for example, if, in one variant, the first shutoff element has a conical surface facing the second shutoff element. It is precisely through the conical design of the surface section of the first shutoff element that faces the second shutoff element that a large opening for passing through the pressure fluid when the nonreturn valve is open is made possible, even if only a short travel of the first shutoff element is provided or is possible. Particularly high dynamics can then be achieved. It is advantageous here if the opening angle of the cone assumes values of between 20° and 60°, with an angle of 45° being particularly advantageous. It is also advantageous if the first shutoff element is controlled exclusively by the flow of the pressure fluid and can manage with or without an additional spring acting on the first shutoff element.

To reduce the mass of the combination valve, it is advantageous if the second shutoff element is designed as a plate.

If the plate has a centrally arranged opening which can be closed in a fluidtight manner by the conical surface projecting into the same, the individual elements of the nonreturn valve and of the pressure relief valve interact in direct contact with each other to achieve particularly high dynamics while simultaneously reducing the total mass.

If the combination valve has a valve housing which comprises a retaining projection for limiting a movement of the first shutoff element in the direction of the pressure chamber, this prevents the pressure fluid from forcing the first shutoff element out of the combination valve. It is advantageous here if the housing guides the first shutoff element. Jamming of the first shutoff element in the housing is thereby prevented, leading to a particularly reliable embodiment of the tensioning device.

To prevent the pressure fluid escaping from the pressure chamber if there is no excess pressure in the pressure chamber, it is advantageous if the valve housing has a sealing projection, which, by interacting with the surface of the second shutoff element, which is designed as a plate, prevents fluid from flowing between the plate and the valve housing.

It is also advantageous if a plastic cartridge is inserted securely in a sealing manner into the valve housing, on the opposite side of the sealing projection from the pressure chamber, the plastic cartridge forming a supporting surface for a spring, and the spring furthermore pushing the plate onto the sealing projection. This ensures that the second shutoff element interacts in a closing manner with the valve housing and, when the first shutoff element is in fluidtight contact with the second shutoff element, no pressure fluid can escape from the pressure chamber or enter the latter. When there is a flow of fluid in the direction of the pressure chamber, however, this fluid pushes the first shutoff element out of a corresponding seat in the second shutoff element and allows pressure fluid to flow into the pressure chamber. Making the cartridge from a plastic material allows a further reduction in the mass of the tensioning device. In that case, it is also possible to preproduce the combination valve in a particularly economical manner. Materials other than plastic can also be used as materials for the cartridge, e.g. light metal or alloys thereof and steel and steel alloys.

If the plastic cartridge has an outer wall which rests in surface contact with the inside of the valve housing, the outer wall having a plurality of fluid guide slots which partially interrupt the same, particularly rapid discharge of the pressure fluid from the pressure chamber and from the tensioning device in the direction of a supply line is made possible in the case of excess pressure. The supply line can be connected to a pressure fluid feed device, such as an oil pump.

The spring which pushes the second shutoff element (preferably designed as a plate) in the direction of the pressure chamber is supported in a manner which is particularly secure against buckling if the plastic cartridge has a hollow cylinder on the opposite side from the pressure chamber, said cylinder extending concentrically with the valve housing in the direction of the plate.

It is furthermore advantageous if there are aligned holes penetrating the outer wall and the hollow cylinder at the end of the plastic cartridge remote from the pressure chamber, said holes being offset by 90° around the axis of rotation, and/or the fluid guide slots are connected to the holes by channels formed in the manner of grooves on the outer wall of the plastic cartridge. The resistance counteracting the pressure fluid as the pressure fluid flows out of the pressure chamber in the case of excess pressure is thereby considerably reduced, significantly improving reliability of the tensioning device.

Different opening pressures can be defined by means of an appropriate spring curve of the spring acting on the plate, leading to a response at different cut-off pressures. In this way, the damping can be varied. The plate and the first shutoff element, which is designed as a cone, are both guided in the combination valve. However, the first shutoff element, i.e. the cone, is guided by the combination valve housing, which is preferably manufactured from steel, whereas the plate, i.e. the second shutoff element, is preferably guided by tabs on the outer wall of the plastic cartridge. By means of the hollow cylinder, the plastic cartridge itself also guides the spring which acts on the plate. This allows oil to be returned from the pressure chamber, in which high pressure prevails, into a low-pressure chamber.

The combination valve can be assembled and tested outside the remainder of the tensioning device. As a result, expensive tests within the individual hydraulic elements are rendered superfluous. Consequently, the outlay on testing is reduced and assembly costs are lower.

Finally, given an appropriate choice of aperture cross section, an increased oil flow rate can be achieved, even with a short valve travel. Moreover, it is possible to use springs with lower spring rates within the pressure chamber. As a result, the change in the preloading force of the tensioner over the tensioner travel is not too severe.

It is also advantageous if the plastic cartridge is press-fitted into the valve housing. It is also possible for the entire combination valve to be press-fitted into an oil supply at virtually any desired location, and this in turn leads to an increased tensioner travel of the hydraulic element, i.e. of the cylinder, for the same installation space.

BRIEF DESCRIPTION OF THE DRAWINGS

The invention is also explained in greater detail below with the aid of a drawing, in which.

DETAILED DESCRIPTION OF THE INVENTION

The figures are of a purely schematic nature and illustrate only the principle of the tensioning device according to the invention. Identical elements are provided with identical reference signs.

Figure 1:
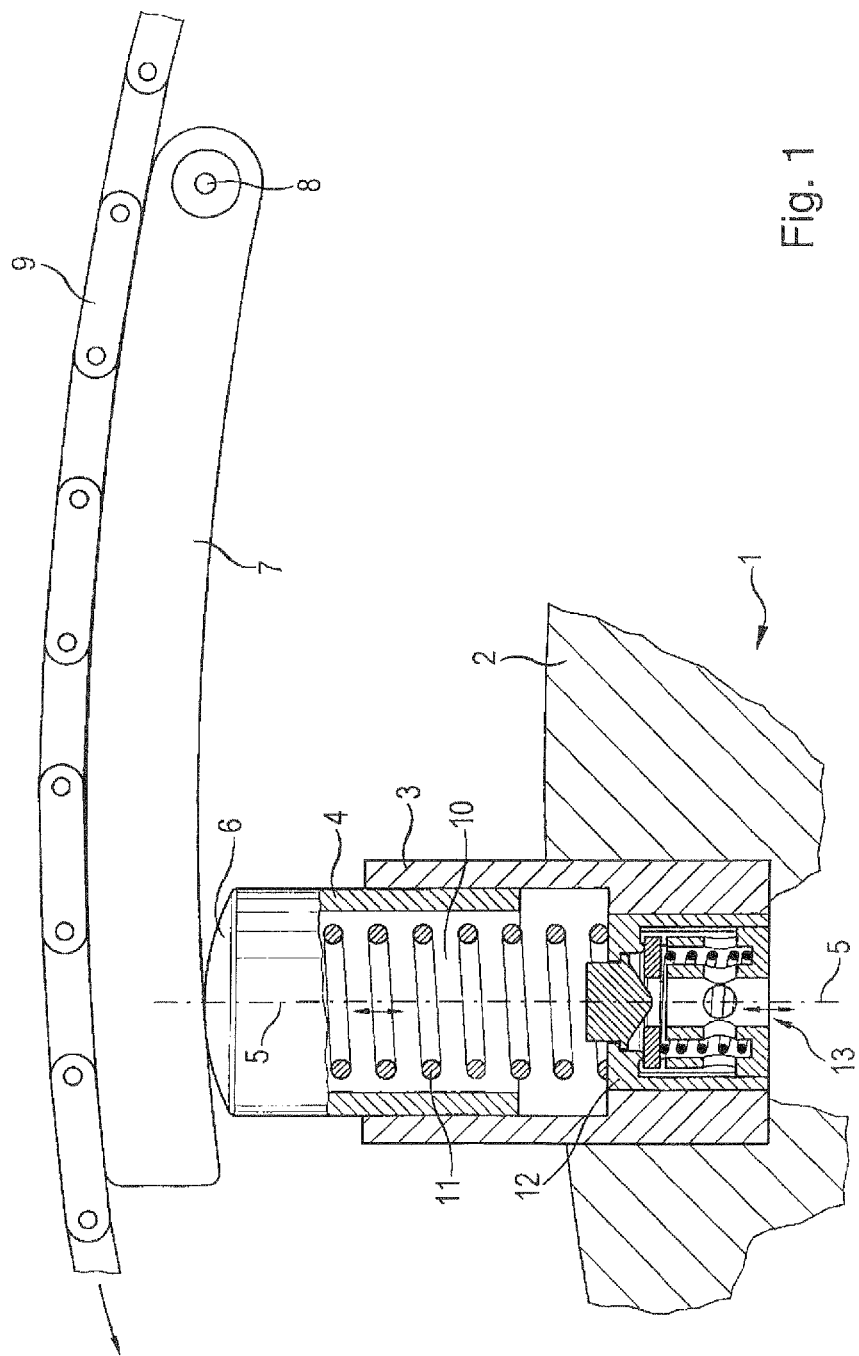
FIG. 1 shows a schematic representation of a tensioning device according to the invention in interaction with a slide rail, along which an endless drive means runs.

FIG. 1 shows the schematic construction of a tensioning device 1 of the kind screwed into an engine component, such as an engine block 2. The tensioning device 1 can also be flanged to the engine block 2.

The tensioning device 1 has a housing 3, in which a cylinder 4 is arranged in such a way that it can move. The cylinder 4 can be moved in the longitudinal direction of the housing 3 along an axis 5 of symmetry of the tensioning device 1. A convex end 6 of the cylinder 4 supports a tensioning rail 7. The tensioning rail 7 can be pivoted about a pivot joint 8. An endless drive means is guided on the opposite side of the tensioning rail 7 from the cylinder 4, and said endless drive means is a chain 9 in the illustrative embodiment shown in FIG. 1. The chain 9 is composed of individual steel links, although it is also possible to use a belt as an alternative to a chain 9.

A pressure chamber 10 is provided between the housing 3 and the cylinder 4. The pressure chamber 10 is filled with a pressure fluid, such as a hydraulic medium, e.g. hydraulic oil. A main spring 11 is also arranged in the pressure chamber 10. One end of the main spring 11 is supported on the cylinder 4 and the other end is supported either on the housing 3 or on a combination valve 12.

The combination valve 12 is screwed or pressed into a supply opening 13 in the housing 3. The supply opening allows the pressure fluid to be fed into the pressure chamber 10.

Figure 2:
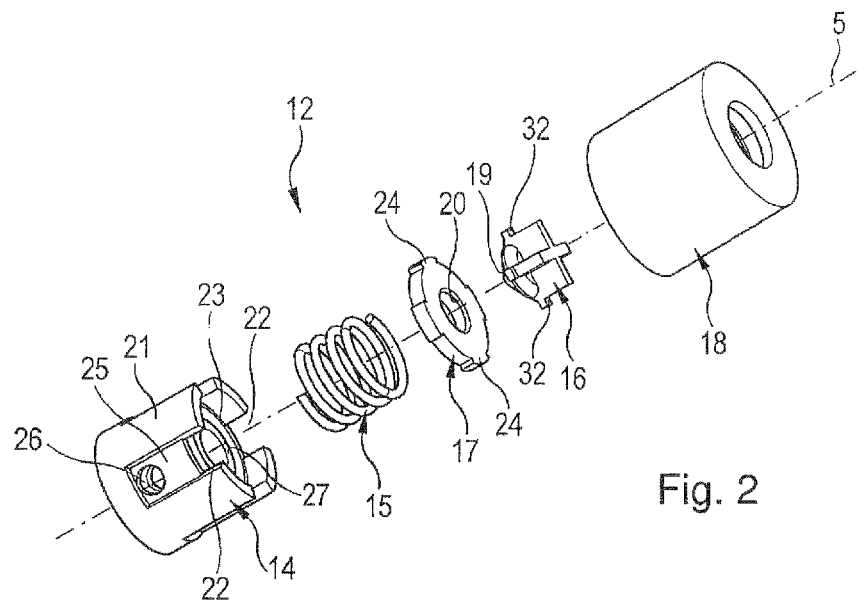
FIG. 2 shows a combination valve of a tensioning device according to the invention in a first exploded representation.

The combination valve 12 is shown in a first exploded representation in FIG. 2. In that figure, the five fundamental components of the combination valve 12 are shown in greater detail. The five components, namely a plastic cartridge 14, a spring 15, a first shutoff element 16, a second shutoff element 17 and a valve housing 18 permit a nonreturn valve function and a relief valve function.

On its side facing the second shutoff element, the first shutoff element 16 has a conical surface 19. The second shutoff element 17 is designed as a plate and has a circular opening 20 in the center thereof.

As can already be seen from FIGS. 1 and 2, the first shutoff element 16, which performs the nonreturn valve function, is situated downstream of the second shutoff element 17, which is designed as a plate. The plastic cartridge 14 is of fundamentally cylindrical construction and has an outer wall 21, which has four fluid guide slots 22 offset by 90°. The fluid guide slots 22 interrupt the outer wall 21 as far as the level of a shoulder 23 situated on the inside of the outer wall 21. The shoulder 23 provides a contact surface for the second shutoff element 17. The outer wall thus forms tabs on the pressure-chamber side.

It is sufficient if, as illustrated in FIG. 2, the second shutoff element 17 has laterally protruding projections 24, which can come into contact with the shoulder 23. The fluid guide slots 22 are continued as groove-type channels 25 on the outside of the outer wall 21. The channels 25 extend as far as the level of holes 26. The holes 26 are arranged transversely, preferably orthogonally, to the axis 5 of symmetry. The holes 26 can also be achieved by a method of production which does not involve cutting, e.g. by forming.

Figure 3:
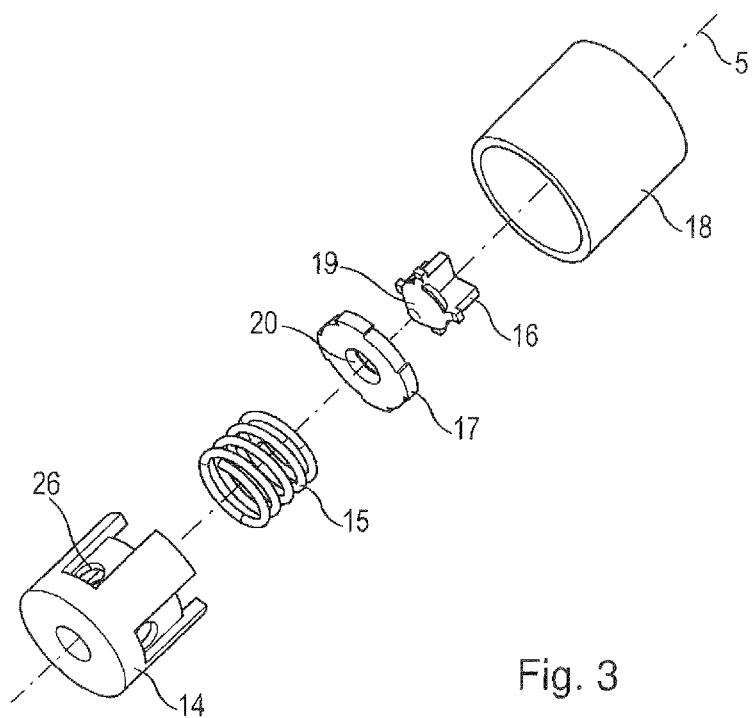
FIG. 3 shows the combination valve of FIG. 2 in a second exploded representation.

Both the valve housing 18, which can be manufactured from steel, and the second shutoff element 17, as well as the plastic cartridge 14 have circular openings arranged concentrically with respect to each other. Surrounding this opening, the plastic cartridge 14 has a further integral component, namely a hollow cylinder 27. As can be seen especially in FIGS. 4 to 7, this hollow cylinder 27 is likewise penetrated by the holes 26. Arranged between the outer wall 21 and the hollow cylinder 27 is the spring 15, which is designed as a helical spring. In this arrangement, the spring 15 is supported on the base of the plastic cartridge 14, between the hollow cylinder 27 and the outer wall 21, on the one hand, and on the plate 17, on the other hand. FIG. 3 shows a larger opening area on the side facing the plastic cartridge 14 than on the side facing the pressure chamber 10, as can be appreciated with reference to FIG. 2.

Figure 4:
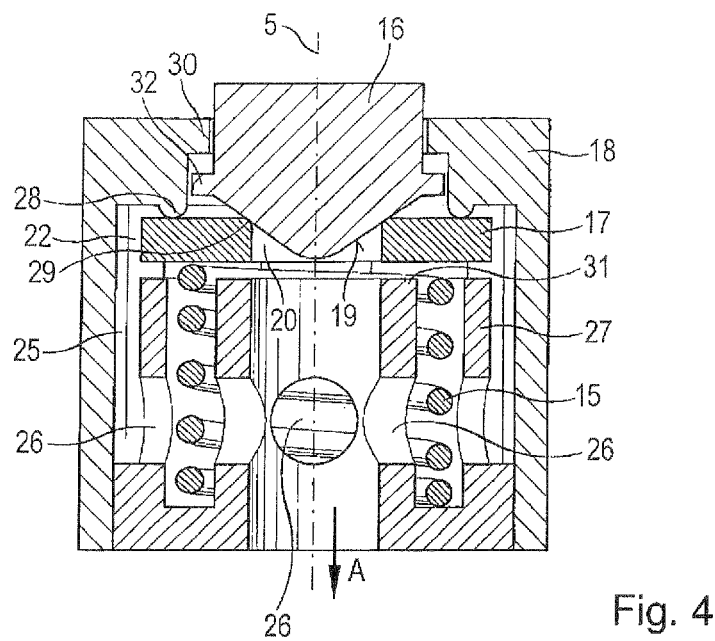
FIG. 4 shows the combination valve of FIGS. 2 and 3 in a fully closed position, in cross section.
Figure 6:
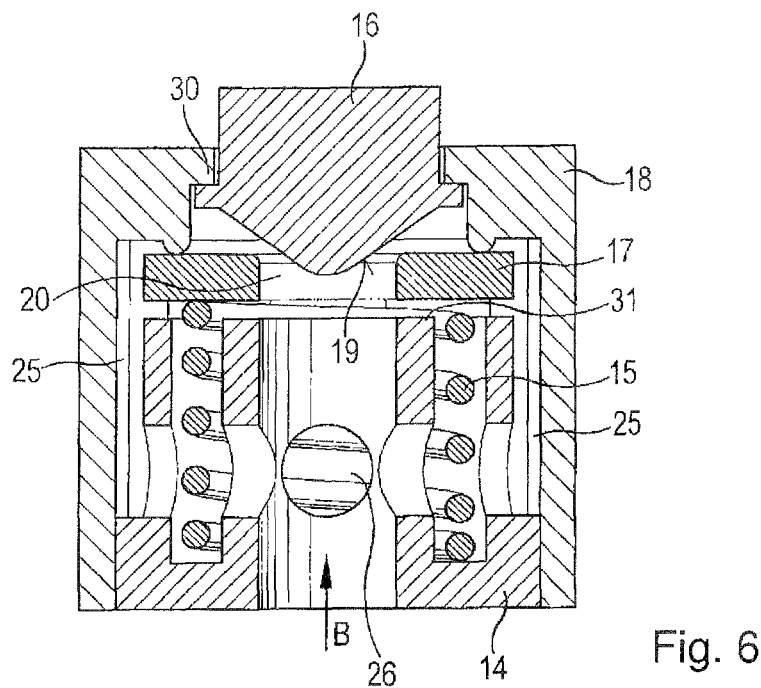
FIG. 6 shows another cross section, in accordance with the cross sections in FIGS. 4 and 5, of the combination valve of FIGS. 2 and 3, with a nonreturn valve section of the combination valve being open and a pressure relief valve section of the combination valve being closed.

FIG. 4 shows the sealing interaction between the surface of the second shutoff element 17 and a sealing projection 28 on the valve housing 18. The sealing interaction between the conical surface 19 and an edge 29 of the opening 20 in the second shutoff element 17 is also clearly visible. In this position, the valve is completely closed and no pressure fluid can pass from the pressure chamber 10 in direction A. If pressure fluid flows in direction B, as illustrated in FIG. 6, the first shutoff element 16 is pushed out of the opening 20 in the second shutoff element 17 until projections 32 are in contact with a retaining projection 30 on the valve housing 18.

Figure 5:
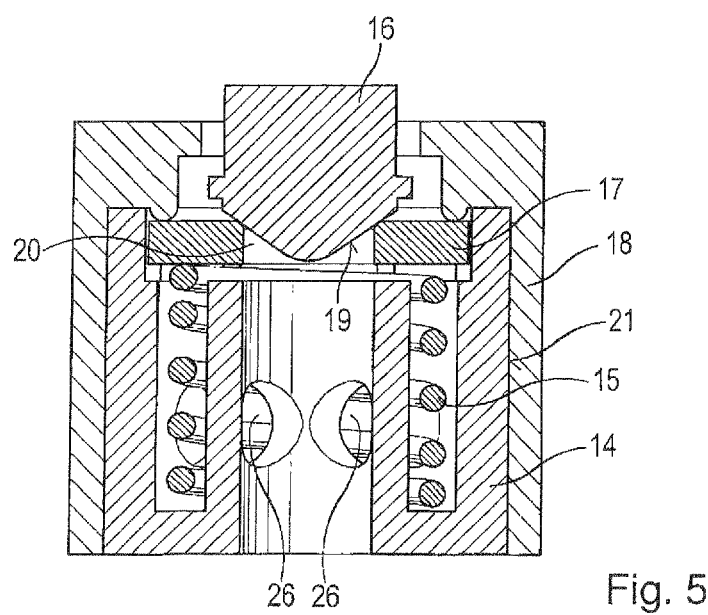
FIG. 5 shows the combination valve from FIG. 4 in the fully closed representation shown there, with the valve being illustrated turned through 45°.

FIG. 5 shows a sectional representation of the fully closed valve from FIG. 4 in a position turned through 45°. It can be clearly seen here that, outside the channels 25 visible in FIG. 2, the outer wall 21 is in contact with an inner surface of the valve housing 18.

The channels 25 lead from the fluid guide slots 22 into the region of the holes 26. The holes 26 are arranged concentrically to one another in the outer wall 21 and the hollow cylinder 27. The spring 15 is guided between the hollow cylinder 27 and the outer wall 21 of the plastic cartridge 14.

Figure 7:
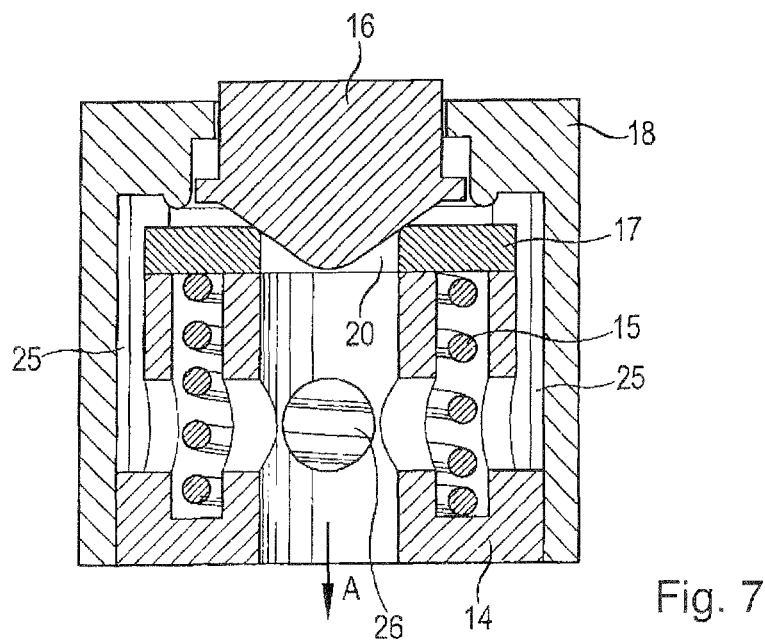
FIG. 7 shows another cross section of the combination valve in FIGS. 2 and 3, with the nonreturn valve section being closed and the pressure relief valve section being open.

The case of excess pressure is illustrated in FIG. 7, where the second shutoff element 17 is no longer in contact with the sealing projection 28, thus allowing pressure fluid to flow out of the pressure chamber 10 in the direction of arrow A, past the sealing projection 28 and the second shutoff element 17, through the fluid slots 22, into the channel 25 and into the holes 26. This allows the pressure fluid to flow back in direction A, counter to the normal direction of flow of the pressure fluid B, as illustrated in FIG. 6.

As can be seen from FIGS. 4 and 5, the first shutoff element 16 is not of rotationally symmetrical design. However, the conical surface has a 45° opening angle. The opening angle is dependent on the travel of the first shutoff element 16 and the area of the opening 20. The spring hardness of the spring 15, the diameter of the opening 20 and the opening angle of the conical surface 19 should be matched to one another according to the desired characteristics. It is to be noted that, the shallower the conical surface 19, the greater the possible dynamics of the combination valve 12, although the fluid-carrying capacity of the first shutoff element 16 diminishes. An appropriate compromise must therefore be found.

The operation of the tensioning device 1 will be explained briefly below.

In normal operation, i.e. in the mode of operation in which the pressure chamber 10 is supplied with pressure fluid by a pressure fluid feed device, such as an oil supply device, the pressure fluid flows in direction B. In this mode, the first shutoff element 16 is pressed onto the retaining projection 30. The pressure fluid nevertheless passes through the combination valve 12 into the pressure chamber 10. During this process, it substantially follows the line 5 of symmetry through the openings in the combination valve 12 and flows around the first shutoff element 16. If the pressure in the pressure chamber 10 is greater than the pressure made available by the oil feed device, the first shutoff element 16 is pressed onto the second shutoff element 17 and closes the opening 20 in the latter. This is illustrated in FIG. 4. The normal flow condition is illustrated in FIG. 6.

If the pressure in the pressure chamber 10 increases still further, this pressure overcomes the counterpressure made available by the spring 15 and pushes the second shutoff element 17 out of contact with the sealing projection 28 and into contact with the shoulder 23 on an upper section 31 of the hollow cylinder 27. This is illustrated in FIG. 7. The pressure fluid now flows out of the pressure chamber 10 through the combination valve 12 in the direction of arrow A. Once the excess pressure has been dissipated, the spring 15 pushes both the first shutoff element 16 and the second shutoff element 17 back into the position illustrated in FIG. 4.

The upper section 31 of the hollow body 27 forms a supporting surface, just like the shoulder 23 on the outer wall 21.

LIST OF REFERENCE SIGNS

1 Tensioning device
2 Engine block
3 Housing
4 Cylinder
5 Axis of symmetry
6 Convex end
7 Tensioning rail
8 Pivot joint
9 Chain
10 Pressure chamber
11 Main spring
12 Combination valve
13 Supply opening
14 Plastic cartridge
15 Spring
16 First shutoff element (cone)
17 Second shutoff element (plate)
18 Valve housing
19 Conical surface
20 Opening
21 Outer wall
22 Fluid guide slot
23 Shoulder
24 Projection on second shutoff element
25 Channel
26 Hole
27 Hollow cylinder
28 Sealing projection
29 Edge
30 Retaining projection
31 Upper section
32 Projection on first shutoff element

The invention claimed is:

1. A tensioning device for an endless drive means, comprising:
    a housing having a supply opening;
    an extendable cylinder arranged inside of the housing;
    a pressure chamber arranged between the housing and the cylinder that is fillable with a pressure fluid via the supply opening in the housing;
    a combination valve inserted in the supply opening and having a nonreturn valve, which is openable in a direction of the pressure chamber and has a movable first shutoff element, and a pressure relief valve, which can be opened counter to the direction of the pressure chamber and has a movable second shutoff element, the first shutoff element of the nonreturn valve being arranged substantially on a pressure chamber side of the second shutoff element,
    the combination valve having a valve housing accommodating both the nonreturn valve and the pressure relief valve, the valve housing comprising a retaining projection for limiting a movement of the first shutoff element in the direction of the pressure chamber.

2. The tensioning device according to claim 1, wherein the first shutoff element has a conical surface facing the second shutoff element.

3. The tensioning device according to claim 2, wherein the second shutoff element is a plate.

4. The tensioning device according to claim 3, wherein the plate has a centrally arranged opening which is closeable in a fluid-tight manner by the conical surface projecting into the centrally arranged opening.

5. The tensioning device according to claim 3, wherein the valve housing has a sealing projection that interacts with a surface of the plate so as to prevent fluid from flowing between the plate and the valve housing.

6. The tensioning device according to claim 5, further comprising a spring that pushes the plate onto the sealing projection and a plastic cartridge inserted securely in a sealing manner into the valve housing on a side of the sealing projection opposite from the pressure chamber so as to form a supporting surface for the spring.

7. The tensioning device according to claim 6, wherein the plastic cartridge has an outer wall which rests in surface contact with an inner surface of the valve housing, the outer wall having a plurality of fluid guide slots which partially interrupt the surface contact.

8. The tensioning device according to claim 7, wherein the plastic cartridge has a hollow cylinder on a side opposite from the pressure chamber, the cylinder extending concentrically with the valve housing in a direction of the plate.

9. The tensioning device according to claim 8, wherein the plastic cartridge has an end remote from the pressure chamber and aligned holes penetrate the outer wall and the hollow cylinder at the end of the plastic cartridge, the holes being offset by 90° around an axis of rotation, and/or the fluid guide slots are connected to the holes by channels formed as grooves on the outer wall together with the plastic cartridge.

* * * * *